(12) United States Patent
Chang et al.

(10) Patent No.: US 12,432,001 B2
(45) Date of Patent: Sep. 30, 2025

(54) DISTRIBUTED SYNCHRONIZATION SYSTEM

(71) Applicant: Ufi Space co., Ltd., New Taipei (TW)

(72) Inventors: Chih-Chin Chang, New Taipei (TW);
Yu-Min Wang, Taoyuan (TW);
Hai-Jian Zhang, New Taipei (TW);
Kai-Yu Yang, New Taipei (TW)

(73) Assignee: Ufi Space co., Ltd., New Taipei (TW)

( * ) Notice: Subject to any disclaimer, the term of this patent is extended or adjusted under 35 U.S.C. 154(b) by 409 days.

(21) Appl. No.: 18/162,621

(22) Filed: Jan. 31, 2023

(65) Prior Publication Data

US 2024/0259151 A1    Aug. 1, 2024

(51) Int. Cl.
*H04J 3/06* (2006.01)
*H04L 5/00* (2006.01)

(52) U.S. Cl.
CPC .......... *H04J 3/0697* (2013.01); *H04L 5/0048* (2013.01)

(58) Field of Classification Search
CPC ................... H04J 3/0638; H04J 3/0644; H04J 3/0658–0667; H04J 3/0679; H04J 3/0685; H04J 3/0697
See application file for complete search history.

(56) References Cited

U.S. PATENT DOCUMENTS

| 9,813,173 | B2 | 11/2017 | Achanta et al. | |
|---|---|---|---|---|
| 11,882,178 | B2* | 1/2024 | Weber | H04L 67/1095 |
| 2019/0158204 | A1* | 5/2019 | Luo | G06F 1/14 |
| 2019/0379474 | A1* | 12/2019 | Coulter | H04J 3/0632 |
| 2022/0200779 | A1* | 6/2022 | Abe | H04J 3/0667 |
| 2022/0329339 | A1* | 10/2022 | Liu | H04J 3/0667 |
| 2023/0367358 | A1* | 11/2023 | Manevich | H04J 3/0697 |
| 2023/0370305 | A1* | 11/2023 | Manevich | H04J 3/0679 |

FOREIGN PATENT DOCUMENTS

| CN | 110581742 | 12/2019 |
|---|---|---|
| TW | I458298 | 10/2014 |
| TW | 201827851 | 8/2018 |

* cited by examiner

*Primary Examiner* — Pao Sinkantarakorn
(74) *Attorney, Agent, or Firm* — JCIPRNET

(57) ABSTRACT

A distributed synchronization system including a management device and a plurality of synchronization devices is provided. The management device includes a network input interface and a network output interface, and is configured to: decode a precision time protocol packet to obtain a reference 1 pulse per second signal, a reference frequency signal, and reference time of day information; send a reference synchronization signal and a reference control signal to a first synchronization device through the network output interface. The reference synchronization signal includes the reference 1 pulse per second signal, the reference frequency signal and the reference time of day information. The reference control signal requests the first synchronization device to synchronize with the management device.

17 Claims, 14 Drawing Sheets

DISTRIBUTED SYNCHRONIZATION SYSTEM

BACKGROUND

Technical Field

The disclosure relates to a communication synchronization mechanism, and particularly relates to a distributed synchronization system.

Description of Related Art

Referring to FIG. 1A, FIG. 1A is a schematic diagram of a conventional chassis switch. As shown in FIG. 1A, in the conventional chassis switch 110, each line card (LC) 112 is independently connected to a control plane (CP) 111 to implement time, phase and frequency synchronization.

Referring to FIG. 1B, IG. 1B is a schematic diagram of a distributed disaggregated chassis (DDC) system. Different from the conventional chassis switch 110 in FIG. 1A, in the DDC system 120 of FIG. 1B, CPs 121 and LCs 122 are connected in a fabric connection method. However, such connection method does not support precision time protocol (PTP) time stamping, SyncE or other hardware clock signal transmission functions, and conventionally, an additional management switch connected to the DDC system is generally configured to solve the above-mentioned problem.

Referring to FIG. 2, FIG. 2 is a schematic diagram of a DDC system configured with a management switch. As shown in FIG. 2, a DDC system 200 may include a management switch 201, a plurality of CPs and a plurality of LCs (each LC may be, for example, regarded as a telecom boundary clock (T-BC)), which may be individually connected to the management switch 201 through a 10 gigabit Ethernet interface (referred to as a 10G interface hereinafter). In FIG. 2, the management switch 201 is, for example, a management device with abilities of IEEE 1588 and synchronous Ethernet (SyncE), and may be used as a boundary clock (BC) to synchronize with the LCs in the DDC system 200.

In this case, the management switch 201 may be configured to synchronize each of the LCs in the DDC system 200 based on PTP packets provided by a grandmaster (GM) 202, so as to synchronize other back-end devices (such as telecom time slave clock (T-TSC), eNodeB, etc., shown in the figure).

However, in the two-layer DDC framework (i.e., one layer is the management switch 201, and the other layer is the multiple LCs in the DDC system 200) shown in FIG. 2, the operation of the management switch 201 generally has a time error of 5-10 ns, and each LC in the DDC system 200 also has a time error of 5-10 ns when performing synchronization, which accordingly affects the accuracy of synchronization.

SUMMARY

Accordingly, the disclosure is directed to a distributed synchronization system, which is adapted to solve the above technical problems.

The disclosure provides a distributed synchronization system including a management device. The management device includes a network input interface and a network output interface, and is configured to: receive a precision time protocol packet, and decode the precision time protocol packet to obtain a reference 1 pulse per second signal, a reference frequency signal, and reference time of day information; send a reference synchronization signal and a reference control signal to a first synchronization device in a plurality of synchronization devices connected in series with each other through the network output interface of the management device. The reference control signal requests the first synchronization device to synchronize with the management device based on the reference synchronization signal.

The disclosure provides a distributed synchronization system including a plurality of synchronization devices The synchronization devices are connected in series with each other and each include a network input interface and a network output interface. A first synchronization device among the synchronization devices is configured to: receive a reference synchronization signal and a reference control signal from a management device through the network input interface of the first synchronization device; perform a synchronization operation with the management device based on the reference synchronization signal and the reference control signal, and accordingly generate a first synchronization signal; send the first synchronization signal and a first control to a second synchronization device among the synchronization devices through the network output interface of the first synchronization device. The reference control signal requests the first synchronization device to synchronize with the management device based on the reference synchronization signal. The first control signal requests the second synchronization device to synchronize with the first synchronization device based on the first synchronization signal.

The disclosure provides a distributed synchronization system including a plurality of synchronization devices connected in series with each other. Each of the synchronization devices includes a network input interface and a network output interface. An $i^{th}$ synchronization device among the synchronization devices is configured to: receive a synchronization signal and a control signal from an $i-1^{th}$ synchronization device among the synchronization devices through the network input interface of the $i^{th}$ synchronization device, where $1 < i \leq N$, and N is a total number of the synchronization devices; perform a synchronization operation with the $i-1^{th}$ synchronization device based on the synchronization signal and the control signal, and accordingly generate another synchronization signal; and send the another synchronization signal and another control signal through the network output interface of the $i^{th}$ synchronization device.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 3:
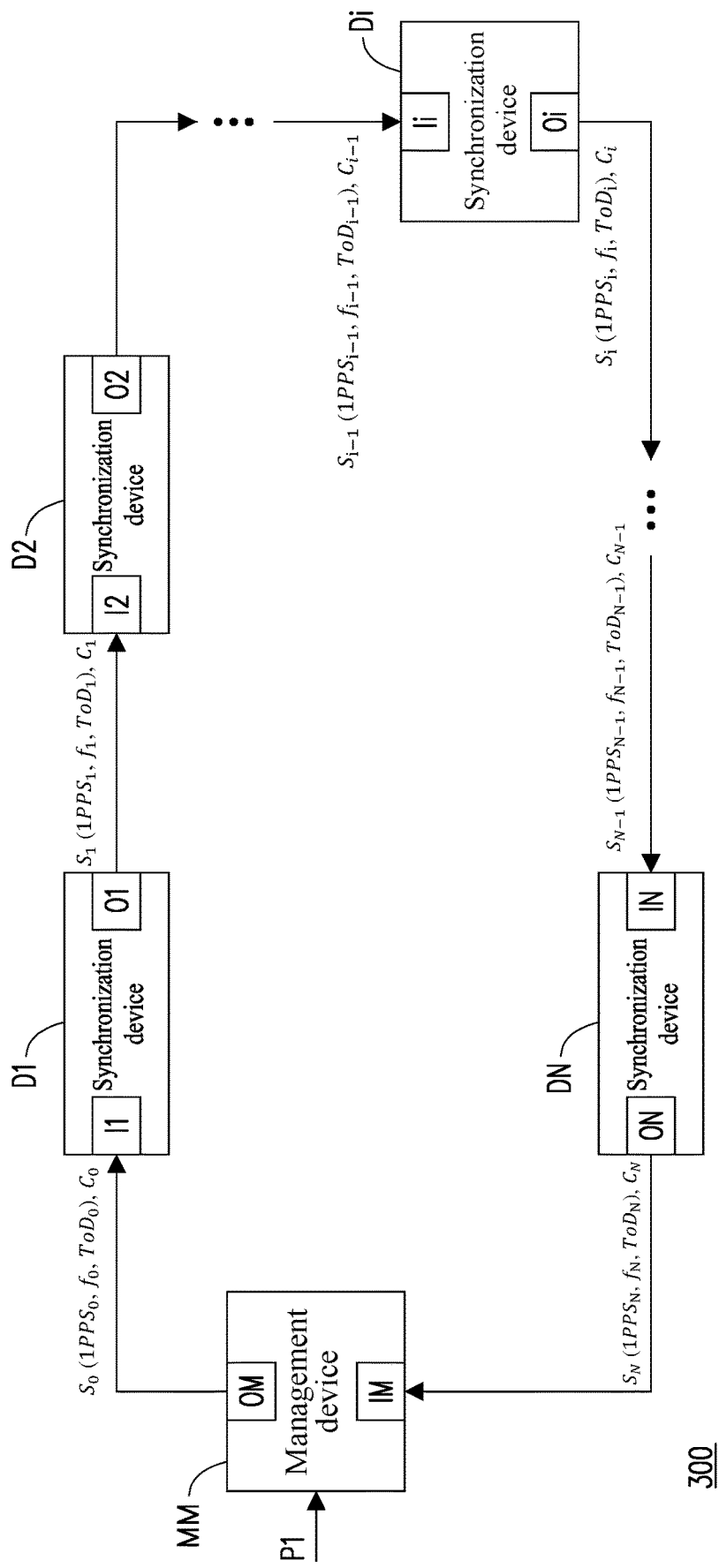
FIG. 3 is a schematic diagram of a distributed synchronization system according to an embodiment of the disclosure.

Referring to FIG. 3, FIG. 3 is a schematic diagram of a distributed synchronization system according to an embodiment of the disclosure. In FIG. 3, a distributed synchronization system 300 is, for example, a DDC system, which may include a management device MM and N synchronization devices D1-DN (N is a positive integer) connected in series with each other, where the management device MM is, for example, a management switch, and the synchronization devices D1-DN may be respectively a line card, but the disclosure is not limited thereto.

In an embodiment of the disclosure, the management device MM may include a network input interface IM and a network output interface OM, which may be respectively an RJ45 input interface and an RJ45 output interface, but the disclosure is no limited thereto. Similarly, each of the synchronization devices D1-DN may also have a network input interface and a network output interface. For example, the synchronization device D1 (which may be regarded as a first synchronization device in the synchronization devices D1-DN) may include a network input interface I1 and a network output interface O1, the synchronization device D2 (which may be regarded as a second synchronization device in the synchronization devices D1-DN) may include a network input interface I2 and a network output interface O2, and the synchronization device DN (which may be regarded as an $N^{th}$ synchronization device in the synchronization devices D1-DN) may include a network input interface IN and a network output interface ON.

For the convenience of description, an $i^{th}$ ($1 \leq i \leq N$) synchronization device in the synchronization devices D1-DN is abbreviated as a synchronization device Di below, and it may include a network input interface Ii and a network output interface Oi, but the disclosure is not limited thereto. In addition, similar to the management device MM, the network input interface Ii and the network output interface Oi of the synchronization device Di may also be the RJ45 input interface and the RJ45 output interface respectively, but the disclosure is not limited thereto.

In brief, the management device MM and the synchronization devices D1-DN may be sequentially connected in series through the RJ45 input/output interfaces to form a ring structure as shown in FIG. 3, and the management device MM and the synchronization devices D1-DN may use conventional RJ45 cables to connect in pairs. In addition, in order to transmit signals between the management device MM and the synchronization devices D1-DN, pins of each of the network input interface and the network output interfaces in FIG. 3 may have different definitions from those of the conventional technology, and related details are introduced later.

In the embodiment of the disclosure, the management device MM, the synchronization device D1, the synchronization device Di ($1 < i < N$) and the synchronization device DN may be individually used to perform a distributed synchronization method proposed by the disclosure, but the individual operations are all different, and further descriptions are made with reference of a first to a fourth embodiments.

In the first embodiment of the disclosure, the management device MM may further include a processing module, and the processing module may include a processor (such as a microprocessor, a controller, a microcontroller, a field programmable gate array (FPGA) and/or a central processing unit (CPU)) and a digital phase-locked loop (DPLL), where the processor may be loaded with specific software, program codes, and application programs to cooperate with the DPLL to implement the distributed synchronization method proposed by the disclosure, and details thereof are described below.

Figure 4A:
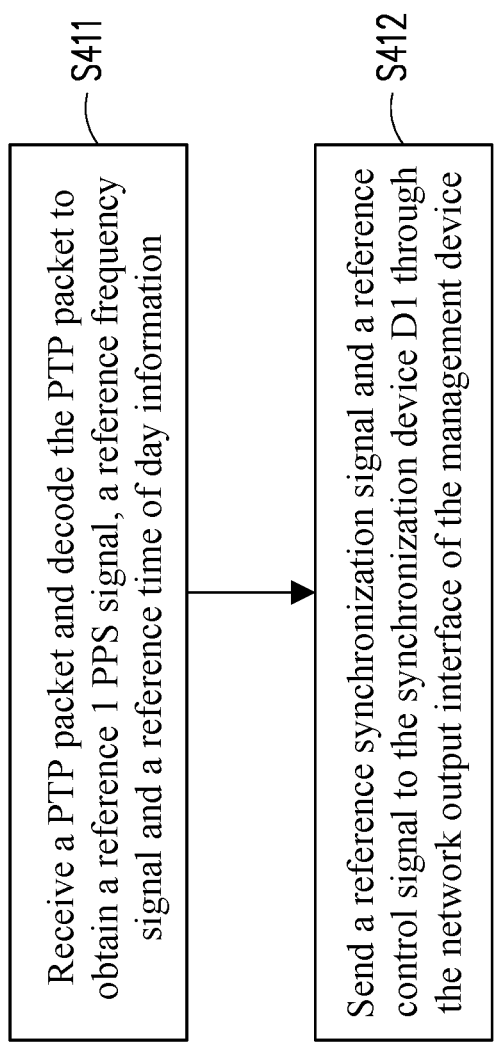
FIG. 4A is a flowchart of a distributed synchronization method according to a first embodiment of the disclosure.

Referring to FIG. 4A, FIG. 4A is a flowchart of a distributed synchronization method according to the first embodiment of the disclosure. The method of the embodiment may be performed by the management device MM in FIG. 3, and the details of each step in FIG. 4A will be described below with reference of the components shown in FIG. 3.

First, in step S411, the management device MM may receive a PTP packet P1 and decode the PTP packet P1 to obtain a reference 1 pulse per second (PPS) signal (referred to as $1PPS_0$ hereinafter), a reference frequency signal (referred to as $f_0$ hereinafter) and a reference time of day information (referred to as $ToD_0$ hereinafter).

Figure 1A:
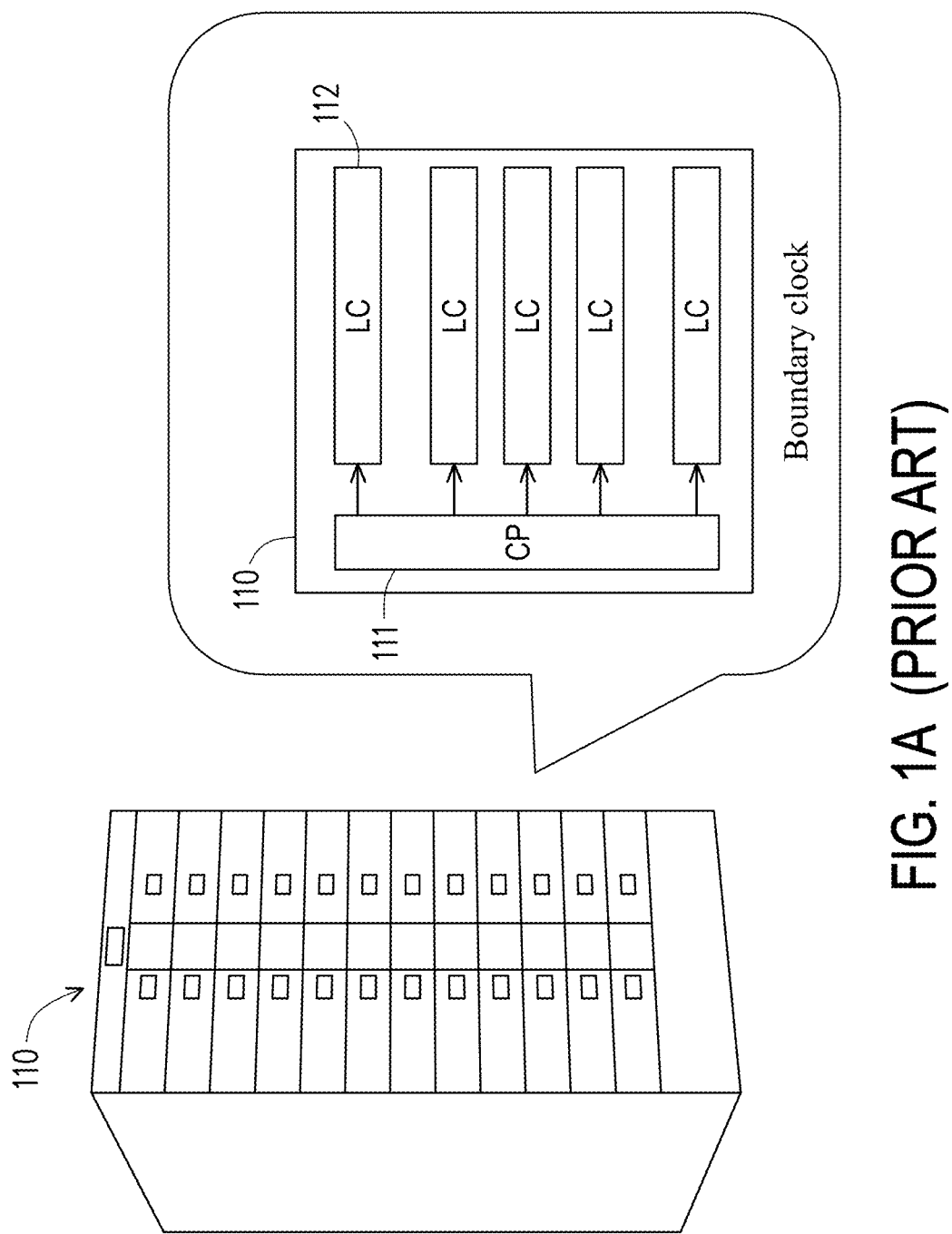
FIG. 1A is a schematic diagram of a conventional chassis switch.
Figure 1B:
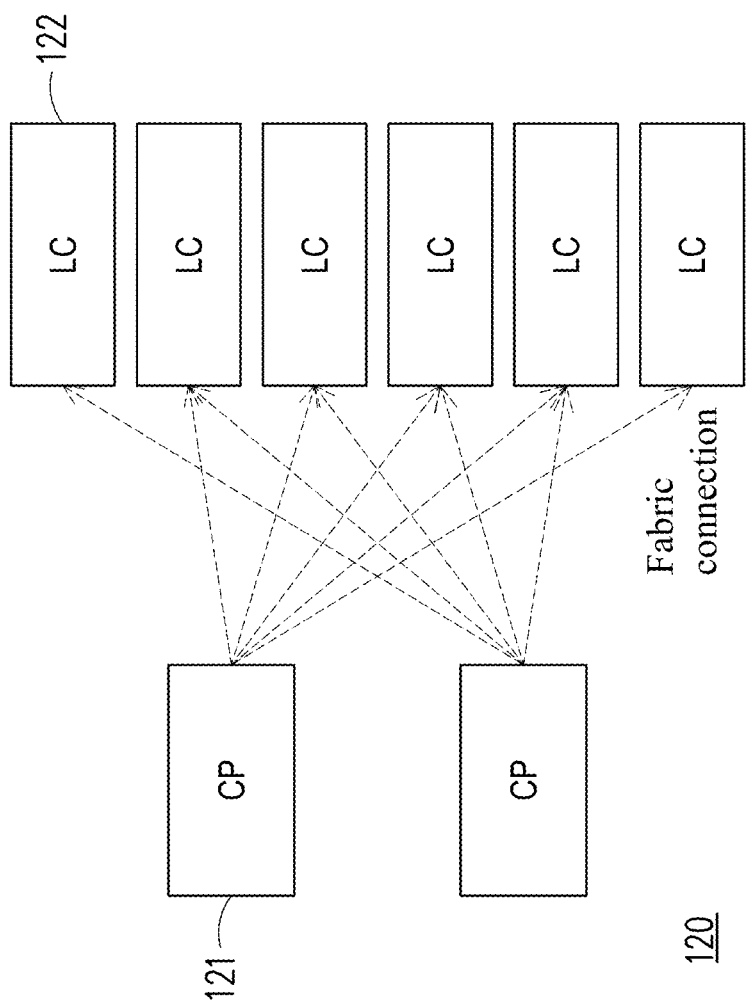
FIG. 1B is a schematic diagram of a distributed disaggregated chassis (DDC) system.
Figure 2:
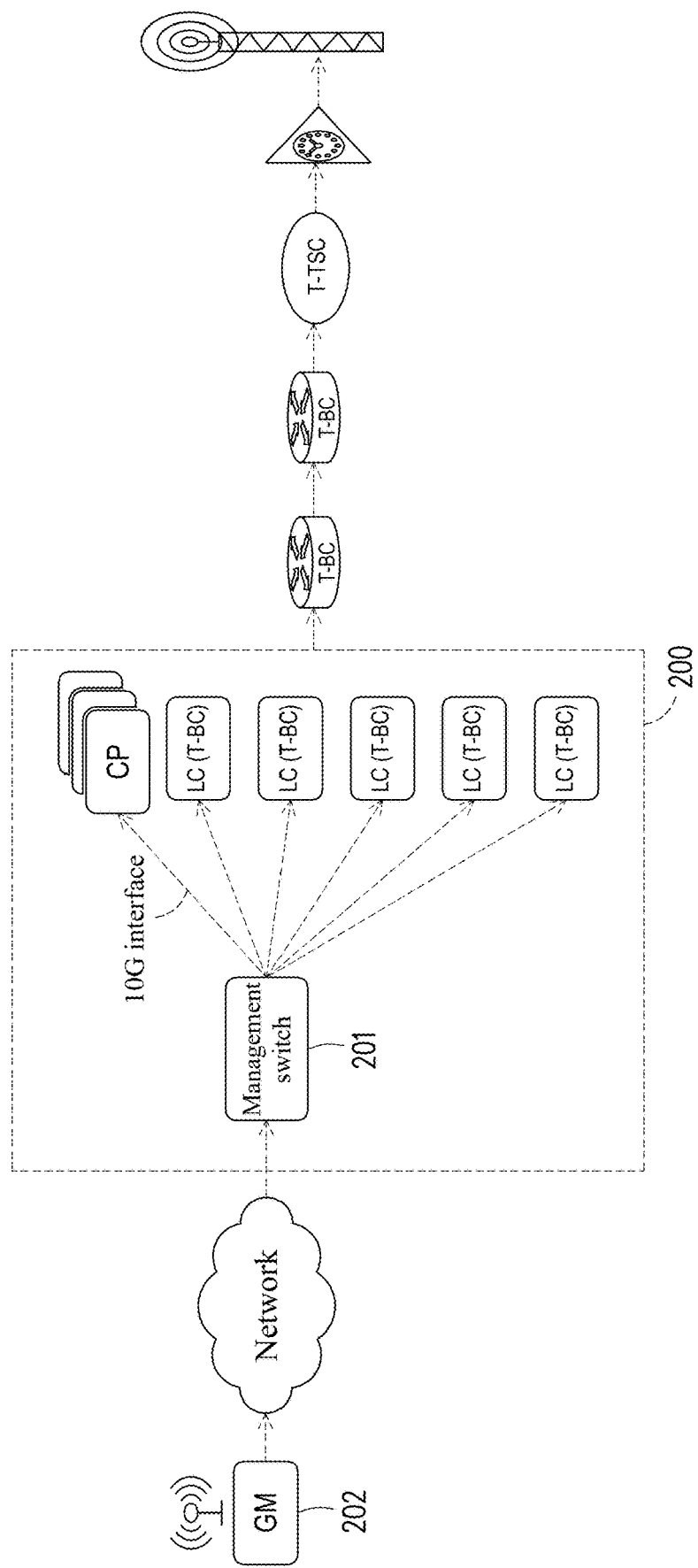
FIG. 2 is a schematic diagram of a DDC system configured with a management switch.

In an embodiment, the management device MM may obtain the above-mentioned PTP packet P1 from the GM shown in FIG. 2 through a network, and may decode it accordingly to obtain $1PPS_0$, $f_0$, $ToD_0$, but the disclosure is not limited thereto. In one embodiment, $f_0$ is, for example, a signal with a preset frequency (for example, 10 MHz), but the disclosure is not limited thereto.

Then, in step S412, the management device MM may send a reference synchronization signal $S_0$ and a reference control signal $C_0$ to the synchronization device D1 (i.e., the first synchronization device in the synchronization devices D1-DN) through the network output interface OM of the management device MM, where the reference synchronization signal $S_0$ may include $1PPS_0$, $f_0$, and $ToD_0$, and the reference control signal $C_0$ may be used to request the synchronization device D1 to synchronize with the management device MM based on the reference synchronization signal $S_0$. In the embodiment of the disclosure, the reference control signal $C_0$ is, for example, a universal asynchronous receiver transmitter (UART) signal, but the disclosure is not limited thereto.

In an embodiment, a digital phase-locked loop of the management device MM may perform a loopback operation on $1PPS_0$, and $1PPS_0$ subjected to the loopback operation may be used to compare with information sent by the synchronization device DN to serve as a reference for the management device MM requiring at least one of the synchronization devices D1-DN to perform a time/phase correction operation. Related details will be further described with reference of the fifth embodiment.

In the second embodiment of the disclosure, the synchronization device D1 may further include a synchronization module, and the synchronization module may include a processor (such as a microprocessor, a controller, a microcontroller, an FPGA and/or a CPU) and a digital phase-locked loop, where the processor may be loaded with specific software, program codes, and application programs to cooperate with the digital phase-locked loop to implement the distributed synchronization method proposed by the disclosure, and details thereof are described below.

Figure 4B:
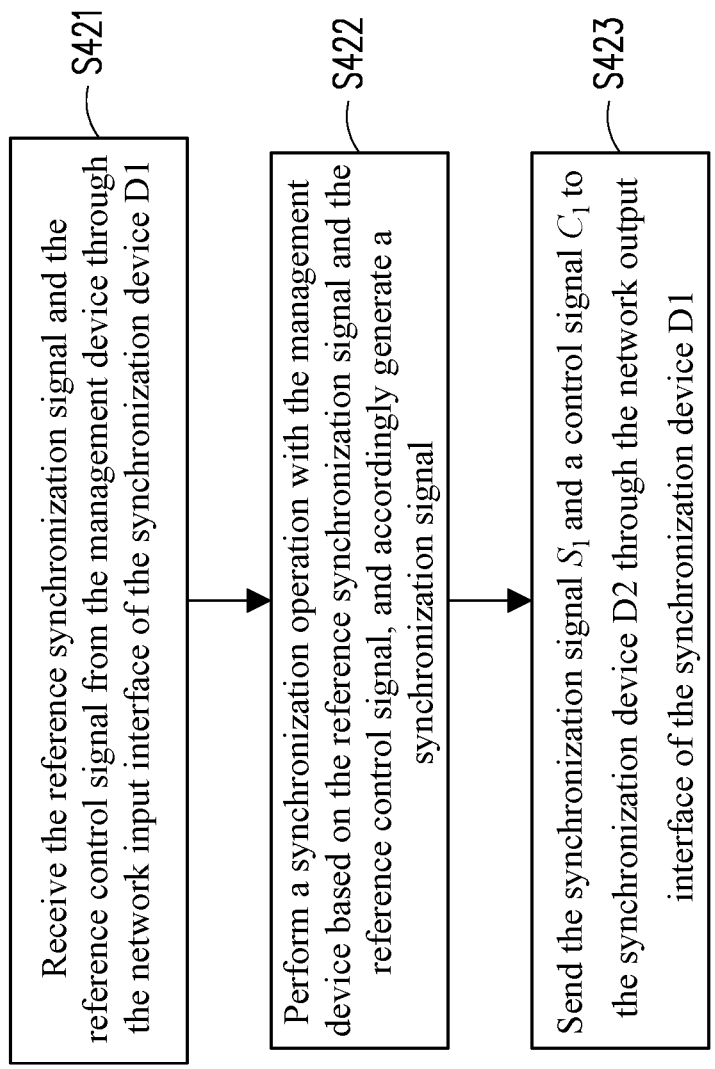
FIG. 4B is a flowchart of a distributed synchronization method according to a second embodiment of the disclosure.

Referring to FIG. 4B, FIG. 4B is a flowchart of a distributed synchronization method according to the second embodiment of the disclosure. The method of the embodiment may be performed by the synchronization device D1 of FIG. 3, and details of each step in FIG. 4B will be described below with reference of the components shown in FIG. 3.

First, in step S421, the synchronization device D1 may receive the reference synchronization signal $S_0$ and the reference control signal $C_0$ from the management device MM through the network input interface I1 of the synchronization device D1.

Then, in step S422, the synchronization device D1 may perform a synchronization operation with the management device MM based on the reference synchronization signal $S_0$ and the reference control signal $C_0$, and accordingly generate a synchronization signal $S_1$. To be specific, since the reference control signal $C_0$ requests the synchronization device D1 to synchronize with the management device MM based on the reference synchronization signal $S_0$, after the synchronization device D1 receives the reference control signal $C_0$, it may accordingly take the management device MM as a master device, and synchronize its own frequency, time, and phase with the management device MM in an identity of a slave device, but the disclosure is not limited thereto.

Therefore, in the second embodiment, the synchronization operation in step S422 may include a time synchronization operation, a frequency synchronization operation and a phase synchronization operation. In an embodiment, the synchronization device D1 may perform frequency synchronization operation with the management device MM based on $f_0$ in the reference synchronization signal $S_0$ to accordingly generate $f_1$ (i.e., a frequency signal generated by the synchronization device D1, which may also correspond to the above preset frequency (for example, 10 MHz)). Moreover, the synchronization device D1 may perform a time synchronization operation with the management device MM based on $ToD_0$ in the reference synchronization signal $S_0$ to accordingly generate $ToD_1$ (i.e., the time of day information generated by the synchronization device D1).

In addition, in the second embodiment, the synchronization device D1 may perform a phase synchronization operation with the management device MM based on $1PPS_0$ in the reference synchronization signal $S_0$ to accordingly generate a specific 1PPS signal. Thereafter, the digital phase-locked loop of the synchronization device D1 may, for example, perform a loopback operation on the specific 1PPS signal, and the synchronization device D1 may estimate a specific offset between $1PPS_0$ and the specific 1PPS signal (after the loopback operation), and correct the specific 1PPS signal to $1PPS_1$ based on the specific offset, but the disclosure is not limited thereto. In an embodiment, the synchronization device D1 may also be connected to the management device MM through the 10G interface, and may report the above-mentioned specific offset to the management device MM through the 10G interface, but the disclosure is not limited thereto.

Then, in step S423, the synchronization device D1 may send the synchronization signal $S_1$ and a control signal $C_1$ to the synchronization device D2 through the network output interface O1 of the synchronization device D1, where the synchronization signal $S_1$ may include $1PPS_1$, $f_1$, $ToD_1$, and the control signal $C_1$ may be generated by the synchronization device D1, and is used to request the synchronization device D2 to synchronize with the synchronization device D1 based on the synchronization signal $S_1$. In the embodiment of the disclosure, the control signal $C_1$ is, for example, a UART signal, but the disclosure is not limited thereto.

In the third embodiment of the disclosure, when $1<i<N$, the synchronization device Di may further include a synchronization module, and the synchronization module may include a processor and a digital phase-locked loop, where the processor may be loaded with specific software, program codes, and application programs to cooperate with the digital phase-locked loop to implement the distributed synchronization method proposed by the disclosure, the details thereof are described below.

Figure 4C:
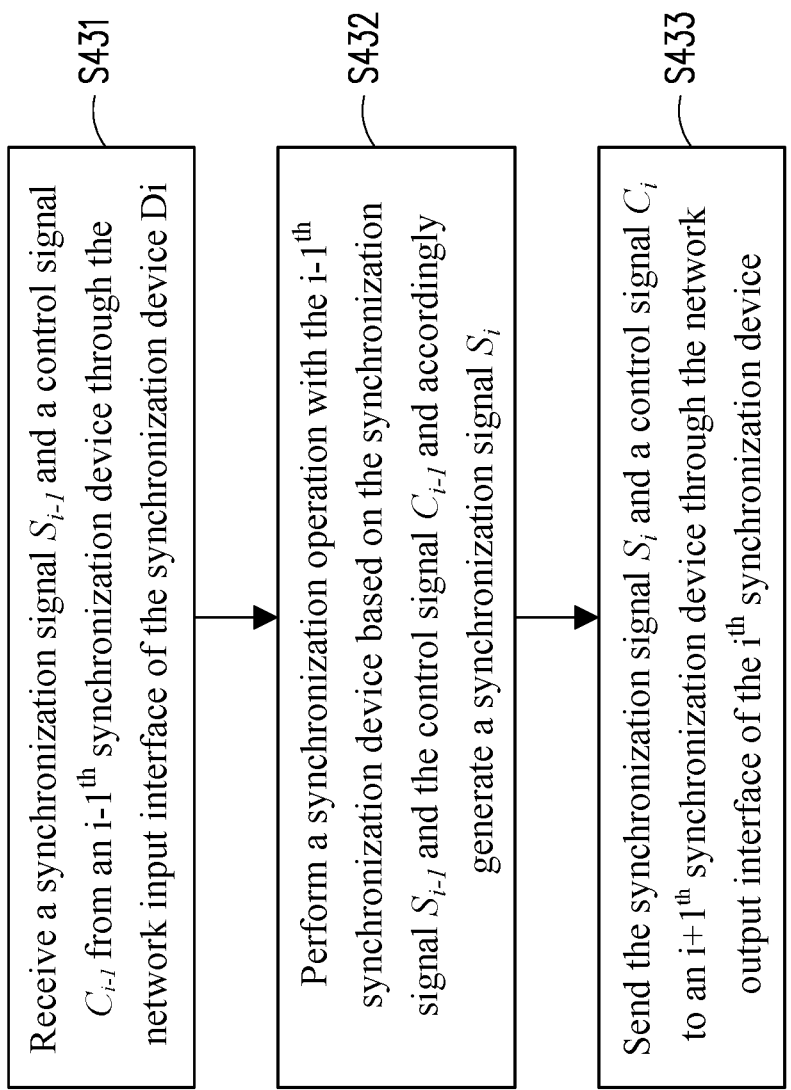
FIG. 4C is a flowchart of a distributed synchronization method according to a third embodiment of the disclosure.

Referring to FIG. 4C, FIG. 4C is a flowchart of a distributed synchronization method according to the third embodiment of the disclosure. The method of the embodiment may be performed by the synchronization device Di ($1<i<N$) of FIG. 3, and details of each step in FIG. 4C will be described below with reference of the components shown in FIG. 3.

First, in step S431, the synchronization device Di may receive a synchronization signal $S_{i-1}$ and a control signal $C_{i-1}$ from an $i-1^{th}$ synchronization device through the network input interface Ii of the synchronization device Di, where the control signal $C_{i-1}$ may be generated by the $i-1^{th}$ synchronization device, and is used to request the synchronization device Di to synchronize with the $i-1^{th}$ synchronization device based on the synchronization signal $S_{i-1}$. In the embodiment of the disclosure, the control signal $C_{i-1}$ is, for example, a UART signal, but the disclosure is not limited thereto.

In addition, the synchronization signal $S_{i-1}$ may include $1PPS_{i-1}$, $f_{i-1}$, $ToD_{i-1}$, where $1PPS_{i-1}$ is a 1PPS signal generated by the $i-1^{th}$ synchronization device, $f_{i-1}$ is a frequency signal (which may also have the above-mentioned preset frequency (for example, 10 MHz)) generated by the $i-1^{th}$ synchronization device, $ToD_{i-1}$ is time of day information generated by the $i-1^{th}$ synchronization device, but the disclosure is not limited thereto.

Thereafter, in step S432, the synchronization device Di may perform a synchronization operation with the $i-1^{th}$ synchronization device based on the synchronization signal $S_{i-1}$ and the control signal $C_{i-1}$ to accordingly generate a synchronization signal $S_1$. To be specific, since the control signal $C_{i-1}$ requests the synchronization device Di to synchronize with the $i-1^{th}$ synchronization device based on the synchronization signal $S_{i-1}$, after the synchronization device Di receives the control signal $C_{i-1}$, it may accordingly take the $i-1^{th}$ synchronization device as a master device, and synchronize its own frequency, time, and phase with the $i-1^{th}$ synchronization device in an identity of a slave device, but the disclosure is not limited thereto.

Therefore, in the third embodiment, the synchronization operation in step S432 may include a time synchronization operation, a frequency synchronization operation and a phase synchronization operation. In an embodiment, the synchronization device Di may perform frequency synchronization operation with the $i-1^{th}$ synchronization device based on $f_{i-1}$ in the synchronization signal $S_{i-1}$ to accordingly generate $f_i$ (i.e., a frequency signal generated by the synchronization device Di, which may also correspond to the above preset frequency (for example, 10 MHz)). Moreover, the synchronization device Di may perform a time synchronization operation with the $i-1^{th}$ synchronization device based on $ToD_{i-1}$ in the synchronization signal $S_{i-1}$ to accordingly generate $ToD_i$ (i.e., the time of day information generated by the synchronization device Di).

In addition, in the third embodiment, the synchronization device Di may perform a phase synchronization operation with the $i-1^{th}$ synchronization device based on $1PPS_{i-1}$ in the synchronization signal $S_{i-1}$ to accordingly generate a specific 1PPS signal. Thereafter, the digital phase-locked loop of the synchronization device Di may, for example, perform a loopback operation on the specific 1PPS signal, and the synchronization device Di may estimate a specific offset between $1PPS_{i-1}$ and the specific 1PPS signal (after the loopback operation), and correct the specific 1PPS signal to $1PPS_i$ based on the specific offset, but the disclosure is not limited thereto. In an embodiment, the synchronization device Di may also be connected to the management device MM through the 10G interface, and may report the above-mentioned specific offset to the management device MM through the 10G interface, but the disclosure is not limited thereto.

Then, in step S433, the synchronization device Di may send the synchronization signal $S_i$ and a control signal $C_i$ to an $i+1^{th}$ synchronization device through the network output interface Oi of the synchronization device Di, where the synchronization signal $S_i$ may include $1PPS_i$, $f_i$, $ToD_i$, and the control signal $C_i$ may be generated by the synchronization device Di, and is used to request the $i+1^{th}$ synchronization device to synchronize with the synchronization device Di based on the synchronization signal $S_i$. In the embodiment of the disclosure, the control signal $C_i$ is, for example, a UART signal, but the disclosure is not limited thereto.

In the fourth embodiment of the disclosure, the synchronization device DN may further include a synchronization module, and the synchronization module may include a processor and a digital phase-locked loop, where the processor may be loaded with specific software, program codes and application programs to cooperate with the digital phase-locked loop to implement the distributed synchronization method proposed by the disclosure, and details thereof are as follows.

Figure 4D:
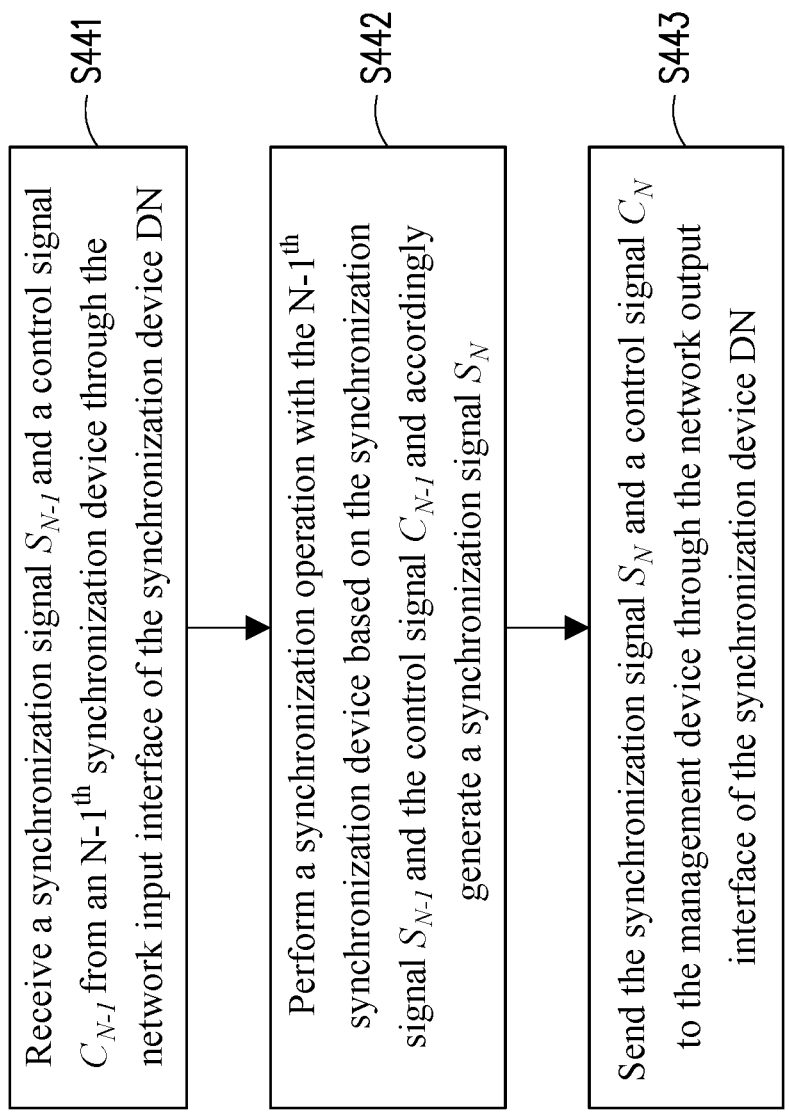
FIG. 4D is a flowchart of a distributed synchronization method according to a fourth embodiment of the disclosure.

Referring to FIG. 4D, FIG. 4D is a flowchart of a distributed synchronization method according to a fourth embodiment of the disclosure. The method of the embodiment may be performed by the synchronization device DN of FIG. 3, and details of each step in FIG. 4D will be described below with reference of the components shown in FIG. 3.

First, in step S441, the synchronization device DN may receive a synchronization signal $S_{N-1}$ and a control signal $C_{N-1}$ from an $N-1^{th}$ synchronization device through the network input interface IN of the synchronization device DN, where the control signal $C_{N-1}$ may be generated by the $N-1^{th}$ synchronization device, and is used to request synchronization device DN to synchronize with the $N-1^{th}$ synchronization device based on the synchronization signal $S_{N-1}$. In the embodiment of the disclosure, the control signal $C_{N-1}$ is, for example, a UART signal, but the disclosure is not limited thereto.

In addition, the synchronization signal $S_{N-1}$ may include $1PPS_{N-1}$, $f_{N-1}$, $ToD_{N-1}$, where $1PPS_{N-1}$ is a 1PPS signal generated by the $N-1^{th}$ synchronization device, $f_{N-1}$ is a frequency signal (which may also have the above-mentioned preset frequency (for example, 10 MHz)) generated by the $N-1^{th}$ synchronization device, $ToD_{N-1}$ is time of day information generated by the $N-1^{th}$ synchronization device, but the disclosure is not limited thereto.

Thereafter, in step S442, the synchronization device DN may perform a synchronization operation with the $N-1^{th}$ synchronization device based on the synchronization signal $S_{N-1}$ and the control signal $C_{N-1}$ and accordingly generate a synchronization signal $S_N$. To be specific, since the control signal $C_{N-1}$ requests the synchronization device DN to synchronize with the M-lth synchronization device based on the synchronization signal $S_{N-1}$, after the synchronization device DN receives the control signal $C_{N-1}$, it may accordingly take the $N-1^{th}$ synchronization device as a master device, and synchronize its own frequency, time, and phase with the $N-1^{th}$ synchronization device in an identity of a slave device, but the disclosure is not limited thereto.

Therefore, in the fourth embodiment, the synchronization operation in step S442 may include a time synchronization operation, a frequency synchronization operation and a phase synchronization operation. In an embodiment, the synchronization device DN may perform frequency synchronization operation with the $N-1^{th}$ synchronization device based on $f_{N-1}$ in the synchronization signal $S_{N-1}$ to accordingly generate $f_N$ (i.e., a frequency signal generated by the synchronization device DN, which may also correspond to the above preset frequency (for example, 10 MHz)). Moreover, the synchronization device DN may perform a time synchronization operation with the $N-1^{th}$ synchronization device based on $ToD_{N-1}$ in the synchronization signal $S_{N-1}$ to accordingly generate $ToD_N$ (i.e., the time of day information generated by the synchronization device DN).

In addition, in the fourth embodiment, the synchronization device DN may perform a phase synchronization operation with the $N-1^{th}$ synchronization device based on $1PPS_{N-1}$ in the synchronization signal $S_{N-1}$ to accordingly generate a specific 1PPS signal. Thereafter, the digital phase-locked loop of the synchronization device DN may, for example, perform a loopback operation on the specific 1PPS signal, and the synchronization device DN may estimate a specific offset between $1PPS_{N-1}$ and the specific 1PPS signal (after the loopback operation), and correct the specific 1PPS signal to $1PPS_N$ based on the specific offset, but the disclosure is not limited thereto. In an embodiment, the synchronization device DN may also be connected to the management device MM through the 10G interface, and may report the above-mentioned specific offset to the management device MM through the 10G interface, but the disclosure is not limited thereto.

Then, in step S443, the synchronization device DN may send the synchronization signal $S_N$ and a control signal $C_N$ to the management device MM through the network output interface ON of the synchronization device DN, where the synchronization signal $S_N$ may include $1PPS_N$, $f_N$, $ToD_N$, and the control signal $C_N$ may be generated by the synchronization device DN, and used to notify the management device MM that the synchronization devices D1-DN have completed the synchronization, but the disclosure is not limited thereto. In the embodiment of the disclosure, the control signal $C_N$ is, for example, a UART signal, but the disclosure is not limited thereto.

In a fifth embodiment, the management device MM may receive the synchronization signal $S_N$ and the control signal $C_N$ from the synchronization device DN through the network input interface IM. Then, the management device MM may estimate a phase offset between $1PPS_0$ and $1PPS_N$ (subjected to the loopback operation), and determine whether the phase offset is greater than an offset threshold.

In an embodiment, in response to determining that the phase offset is greater than the offset threshold, the management device MM may control at least one of the synchronization devices D1-DN to perform a phase correction operation according to a difference between the phase offset and the offset threshold.

For example, it is assumed that the phase offset between $1PPS_0$ and $1PPS_N$ is +7 ns, and the offset threshold is 5 ns. In this case, the management device MM may, for example, control at least one of the synchronization devices D1-DN to perform the phase correction operation based on the difference (i.e., +2 ns) between +7 ns and 5 ns. For example, the management device MM may request two of the synchronization devices D1-DN to slow down the generated 1PPS signal by 1 ns (i.e., slow down by 2 ns in total) to implement the above-mentioned phase correction operation, but the disclosure is not limited thereto.

As described above, through the distributed synchronization system and method proposed by the disclosure, synchronization of the synchronization devices D1-DN may be implemented at a lower cost when the management device MM does not have the IEEE 1588 and SyncE functions. Moreover, compared with the two-layer DDC framework shown in FIG. 2, the single-layer DDC framework in FIG. 3 may achieve higher synchronization accuracy.

Figure 5:
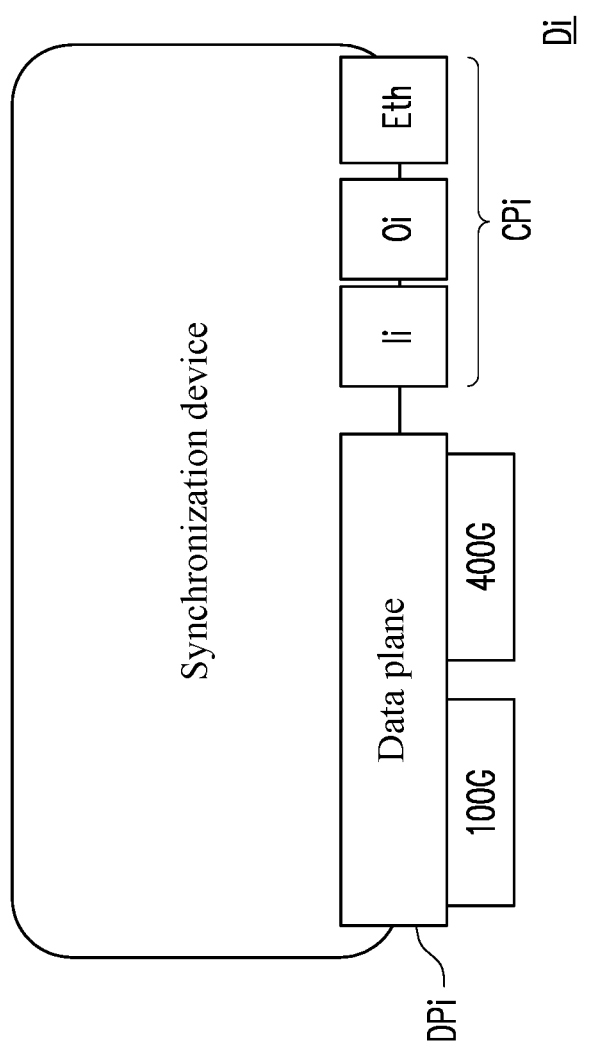
FIG. 5 is a schematic diagram of a data plane and a control plane of a synchronization device according to an embodiment of the disclosure.

Referring to FIG. 5, FIG. 5 is a schematic diagram of a data plane and a control plane of a synchronization device according to an embodiment of the disclosure. In FIG. 5, each synchronization device Di ($1 \leq i \leq N$) may include a data plane DPi and a control plane CPi, where the data plane DPi may include 100G and 400G interfaces, and the control plane CPi may include the network input interface Ii, the network output interface Oi and a 10G interface Eth, but the disclosure is not limited thereto.

In the embodiment, since the synchronization device Di receives/sends the synchronization signal and the control signal through the network input interface Ii and the network output interface Oi belonging to the control plane CPi, rather than receiving/sending the synchronization signal and the control signal with less data amount through the 100G and 400G interfaces (i.e., having higher transmission capacity) belonging to the data plane DPi, the hardware resources of the synchronization device Di may be more properly utilized.

Figure 6:
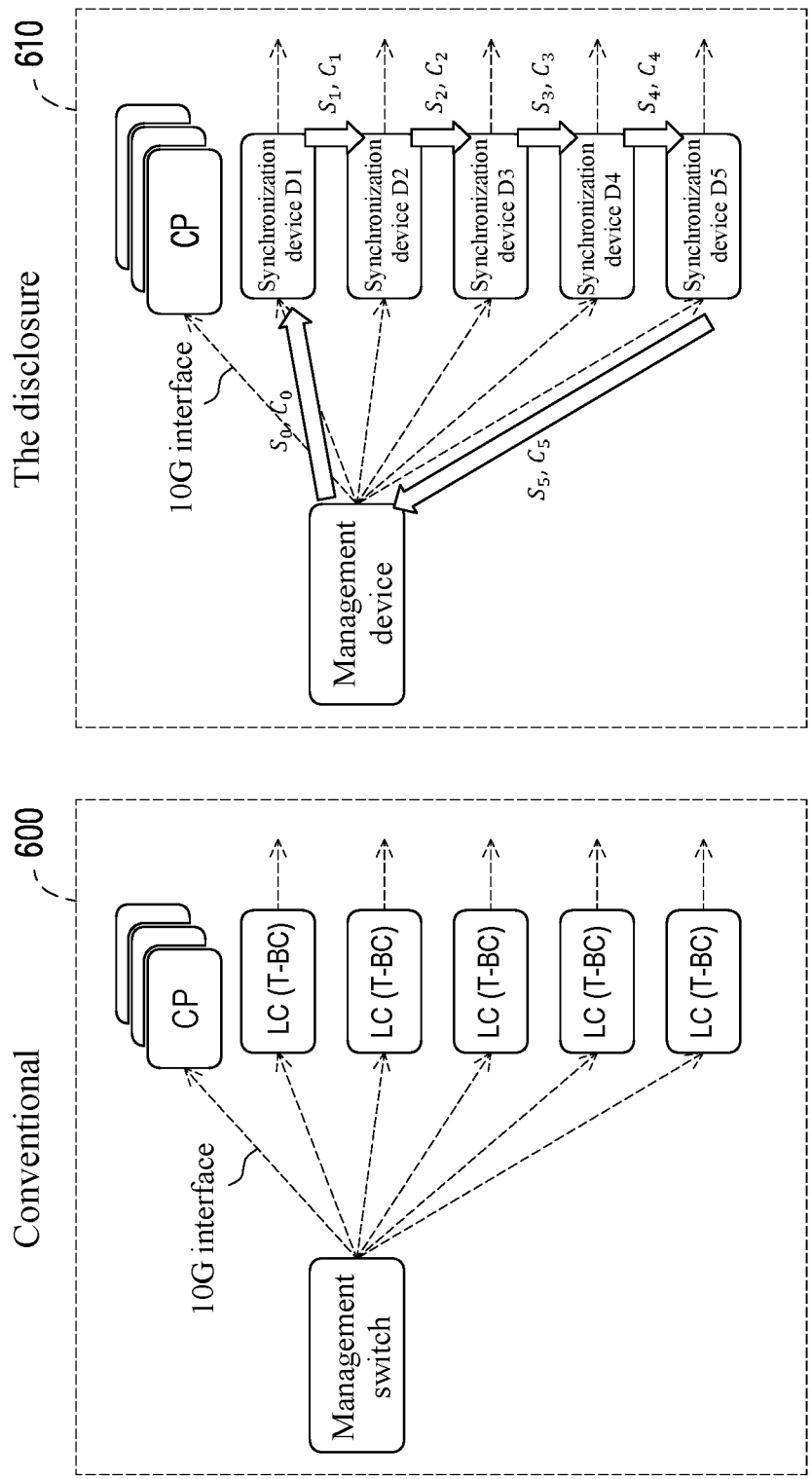
FIG. 6 is a technical comparison diagram drawn based on FIG. 2 and FIG. 3.

In order to make the concept of the disclosure easier to understand, differences between the disclosure and the convention are described below with reference of FIG. 6. Referring to FIG. 6, FIG. 6 is a technical comparison diagram drawn based on FIG. 2 and FIG. 3. In FIG. 6, a DDC system 600 is, for example, the same as the DDC system 200 in FIG. 2, and the DDC system 610 is, for example, an implementation pattern of the distributed synchronization system 300 of FIG. 3 (i.e., the implementation pattern when N is 5).

As previously mentioned, the management switch and each LC in the DDC system 600 are respectively a boundary clock. However, after implementing the distributed synchronization method proposed by the disclosure, the management device MM and the synchronization devices D1-D5 in the DDC system 610 may be respectively understood as an ordinary clock (OC), thus embodying a different operation mode/concept from the DDC system 600.

In addition, as described above, in order to allow each network input interface and network output interface in FIG. 3 to be used to transmit the time of day information (such as $ToD_0$-$ToD_N$), the control signals (such as $C_0$-$C_N$), the 1PPS signals (such as $1PPS_0$-$1PPS_N$) and the frequency signals (such as $f_0$-$f_N$), pins of each network input interface and network output interface may have different definitions from the conventional RJ45, which will be further explained below.

In an embodiment of the disclosure, the mentioned time of day information, the control signals, the 1PPS signals and the frequency signals may be respectively a differential signal. In this case, each of the 1PPS signals (such as $1PPS_0$-$1PPS_N$) may be understood as including signal components of 1PPS-, 1PPS+, etc.; each of the frequency signals (for example, $f_0$-$f_N$ corresponding to 10 MHz) may be understood as including signal components of 10M-, 10M+, etc.; each of the control signals (such as $C_0$-$C_N$) may be understood as including signal components of UART-, UART+, etc.; and each time of day information (such as $ToD_0$-$ToD_N$) may be understood as including signal components of ToD-, ToD+, etc., but the disclosure is not limited thereto.

Figure 7:
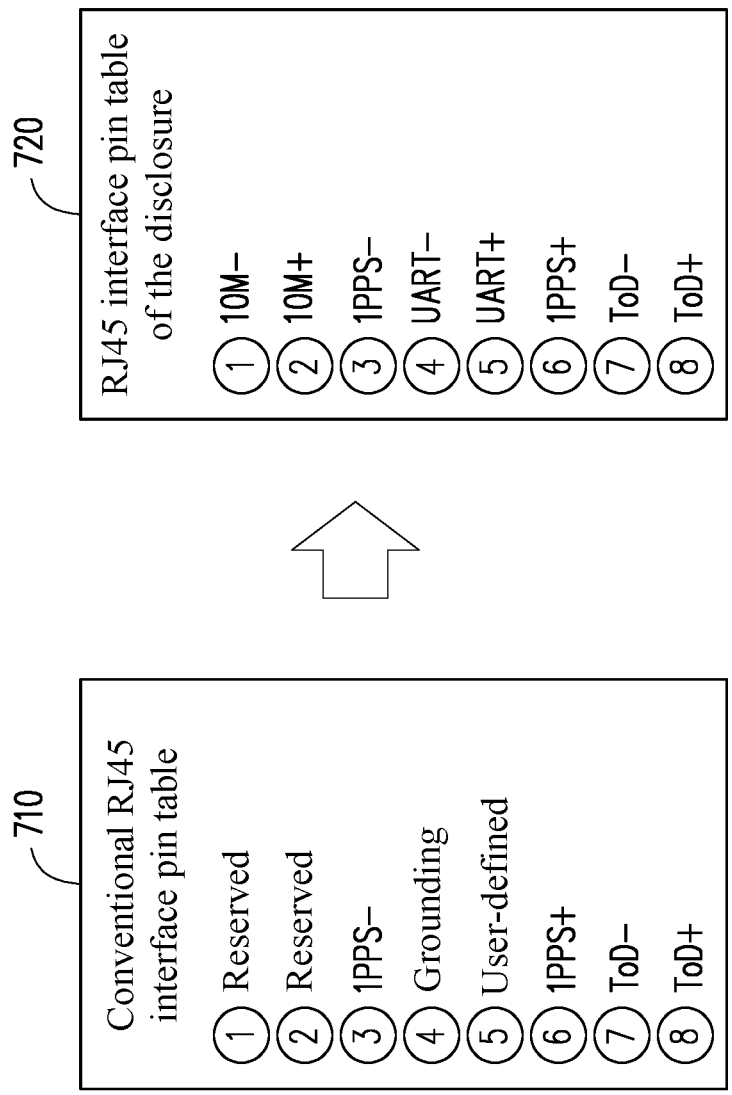
FIG. 7 is a comparison diagram between a conventional RJ45 interface pin table and a RJ45 interface pin table of the disclosure according to an embodiment of the disclosure.

Referring to FIG. 7, FIG. 7 is a comparison diagram between a conventional RJ45 interface pin table and a RJ45 interface pin table of the disclosure according to an embodiment of the disclosure. As shown in FIG. 7, there are 8 pins numbered as a number 1 to a number 8 in a conventional RJ45 interface pin table 710, where the number 1 and the number 2 (the pins numbered as the number 1 and the number 2 are referred to as first pins hereinafter) are reserved pins, the number 3 is used to transmit/receive 1PPS-, the number 4 is a ground pin, and the number 5 is a user-defined pin (the pins numbered as number 4 and number 5 are referred to as second pins hereinafter), the number 6 is used to transmit/receive 1PPS+, the number 7 is used to transmit/receive ToD-, and the number 8 is used to transmit/receive ToD+.

However, in the RJ45 interface pin table 720 of the disclosure, the number 1 is changed to transmit/receive 10M-, and the number 2 is changed to transmit/receive 10M+ (i.e., the above-mentioned first pins are changed to transmit/receive frequency signals). In addition, the number 4 is changed to transmit/receive UART-, and the number 5 is changed to transmit/receive UART+ (i.e., the above-mentioned second pins are changed to transmit/receive control signals). The functions of the other numbers 3, 6, 7 and 8 are not changed.

In this case, when any network input interface in FIG. 3 adopts the RJ45 interface pin table 720, this network input interface may respectively receive signal components such as 10M-, 10M+, 1PPS-, UART-, UART+, 1PPS+, ToD-, ToD+, etc., through the pins numbered as 1-8, but the disclosure is not limited thereto. In other words, the numbers 1 and 2 may be understood as the first input pins, the numbers 3 and 6 may be understood as 1PPS signal input pins, the numbers 4 and 5 may be understood as the second input pins, and the numbers 7 and 8 may be understood as time of day signal input pins, but the disclosure is not limited thereto.

On the other hand, when any network output interface in FIG. 3 adopts the RJ45 interface pin table 720, this network input interface may respectively transmit signal components such as 10M-, 10M+, 1PPS-, UART-, UART+, 1PPS+, ToD- and ToD+, etc., through the pins numbered as 1-8, but the disclosure is not limited thereto. In other words, the numbers 1 and 2 may be understood as the first output pins, the numbers 3 and 6 may be understood as 1PPS signal output pins, the numbers 4 and 5 may be understood as the second output pins, and the numbers 7 and 8 may be understood as time of day signal output pins, but the disclosure is not limited thereto.

Figure 8:
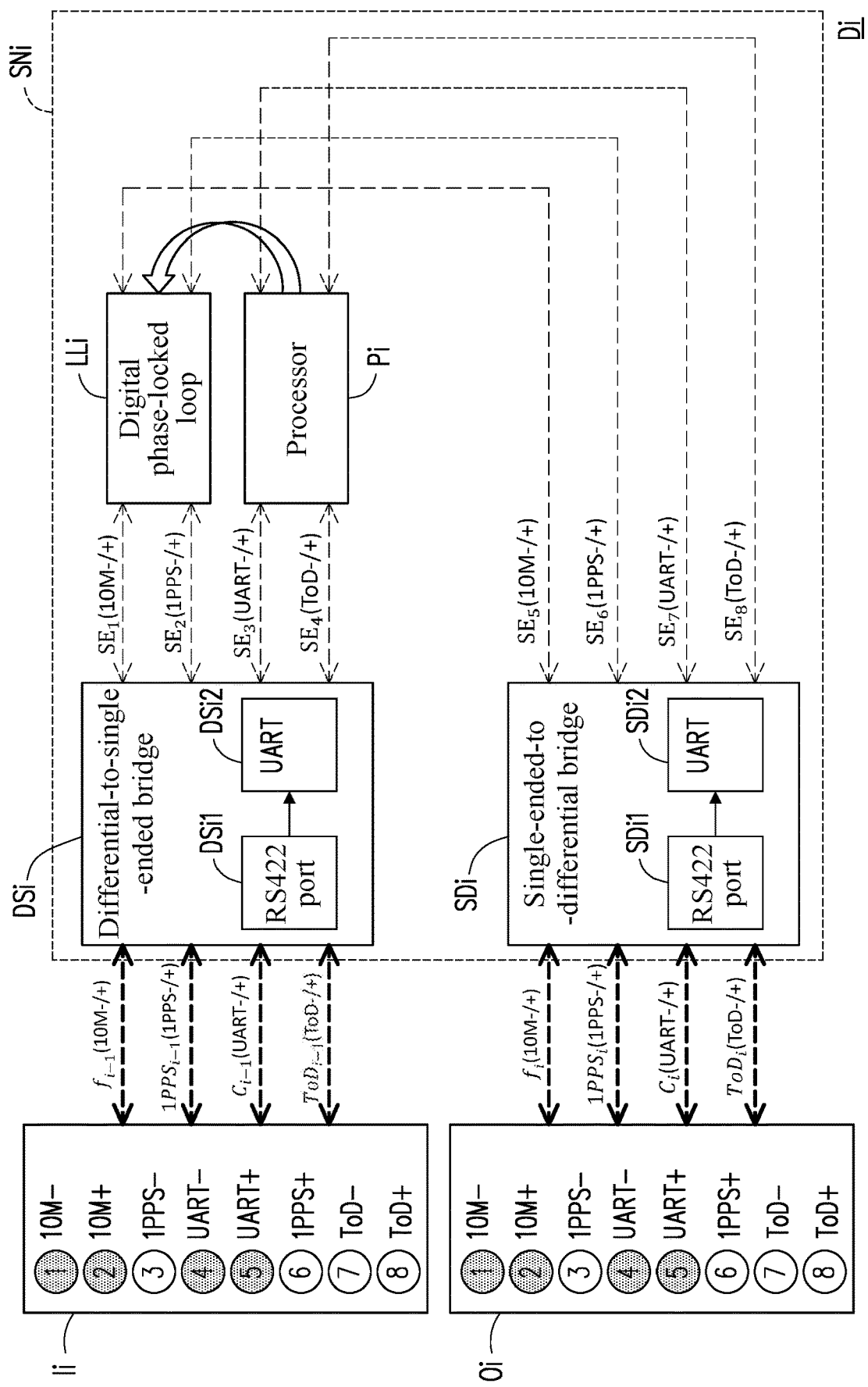
FIG. 8 is a functional block diagram of a synchronization device according to an embodiment of the disclosure.

Referring to FIG. 8, FIG. 8 is a functional block diagram of a synchronization device according to an embodiment of the disclosure. In FIG. 8, a synchronization device Di may include a network input interface Ii, a network output interface Oi, and a synchronization module SNi, where the network input interface Ii and the network output interface Oi may individually adopt the RJ45 interface pin table 720 shown in FIG. 7.

In this case, the network input interface Ii may be used to receive $1PPS_{i-1}$, $f_{i-1}$, $ToD_{i-1}$ and the control signal $C_{i-1}$ from a previous-stage device, and the network output interface Oi may be used to transmit $1PPS_{i-1}$, $f_{i-1}$, $ToD_{i-1}$ and the control signal $C_{i-1}$ generated by the synchronization device Di to a next-stage device. For example, if the synchronization device Di is the synchronization device D1 (i.e., i is 1), the network input interface Ii may be used to receive $1PPS_0$, $f_0$, $ToD_0$ and the reference control signal $C_0$ from the management device MM in FIG. 3 (i.e., the previous-stage device of the synchronization device D1), while the network output interface Oi may be used to transmit $1PPS_1$, $f_1$, $ToD_1$ and the control signal $C_1$ to the synchronization device D2 (i.e., the next-stage device of the synchronization device D1). For another example, if the synchronization device Di is the synchronization device DN (i.e., i is N), the network input interface Ii may be used to receive $1PPS_{N-1}$, $f_{N-1}$, $ToD_{N-1}$ and the control signal $C_{N-1}$ from the $N-1^{th}$ synchronization device in FIG. 3 (i.e., the previous-stage device of the synchronization device DN), and the network output interface Oi may be used to transmit $1PPS_N$, $f_N$, $ToD_N$ and the control signal $C_N$ to the management device MM (i.e. the next-stage device of the synchronization device DN).

Moreover, as mentioned above, the control signal $C_{i-1}$, $1PPS_{i-1}$, $f_{i-1}$, $ToD_{i-1}$ received by the network input interface Ii may be respectively a differential signal, i.e., 10M−/+, 1PPS−/+, UART−/+ and ToD−/+ shown by double dashed lines in an upper half of FIG. 8.

In an embodiment, the synchronization module SNi may perform the synchronization operation with the previous-stage device based on the control signal $C_{i-1}$, $1PPS_{i-1}$, $f_{i-1}$, $ToD_{i-1}$ and accordingly generate the synchronization signal $S_i$ and the control signal $C_i$. Thereafter, the synchronization module SNi may send the synchronization signal $S_1$ and the control signal $C_i$ to the next-stage device through the network output interface Oi. Regarding details of the operations performed by the synchronization module SNi, reference may be made to the descriptions of the synchronization devices D1-DN in the previous embodiments, which will not be repeated here.

As shown in FIG. 8, the synchronization module SNi may include a differential-to-single-ended bridge DSi, a digital phase-locked loop LLi, a processor Pi, and a single-ended-to-differential bridge SDi. The differential-to-single-ended bridge DSi may be coupled to the network input interface Ii, and used for respectively converting $f_{i-1}$, $1PPS_{i-1}$, the control signal $C_{i-1}$ and $ToD_{i-1}$ into a corresponding first single-ended signal $SE_1$, a second single-ended signal $SE_2$, a third single-ended signal $SE_3$ and a fourth single-ended signal $SE_4$.

In an embodiment, due to hardware characteristics, two differential signals such as the control signal $C_{i-1}$ and $ToD_{i-1}$ will be bundled with each other, so that after receiving the bundled control signal $C_{i-1}$ and $ToD_{i-1}$, the differential-to-single-ended bridge DSi may separate the two differential signals and individually convert them into corresponding single-ended signal.

In this case, the differential-to-single-ended bridge DSi may include a RS422 port DSi1 and a UART DSi2. The RS422 port DSi1 may be coupled to the above-mentioned second input pins (i.e., the numbers 4 and 5 of the network input interface Ii) and the above-mentioned time of day signal input pins (i.e., the numbers 7 and 8 of the network input interface Ii), and is configured to receive the reference control signal and $ToD_0$ bundled with each other. Moreover, the UART DSi2 may be coupled to the RS422 port DSi1 and the processor Pi, and is configured to separate the control signal $C_{i-1}$ and $ToD_{i-1}$, and respectively convert the control signal $C_{i-1}$ and $ToD_{i-1}$ are converted into the corresponding third single-ended signal $SE_3$ and fourth single-ended signal $SE_4$.

The digital phase-locked loop LLi is coupled to the differential-to-single-ended bridge DSi, and receives the first single-ended signal $SE_1$ and the second single-ended signal $SE_2$ respectively corresponding to $f_{i-1}$ and $1PPS_{i-1}$.

The processor Pi is coupled to the digital phase-locked loop LLi and the differential-to-single-ended bridge DSi, and is configured to control the digital phase-locked loop LLi to perform a frequency synchronization operation and a phase synchronization operation with the previous-stage device based on the first single-ended signal $SE_1$ and the second single-ended signal $SE_2$, and accordingly generate a fifth single-ended signal $SE_5$ and a sixth single-ended signal $SE_6$, where the fifth single-ended signal $SE_5$ and the sixth single-ended signal $SE_6$ respectively correspond to the first single-ended signal $SE_1$ and the second single-ended signal $SE_2$. Then, the processor Pi may receive the third single-ended signal $SE_3$ and the fourth single-ended signal $SE_4$ respectively corresponding to the control signal $C_{i-1}$ and $ToD_{i-1}$ from the differential-to-single-ended bridge DSi, and generate a seventh single-ended signal $SE_7$ (i.e., a single-ended signal used to control the next-stage device to synchronize with the synchronization device Di) based on the third single-ended signal $SE_3$. Moreover, the processor Pi may perform a time synchronization operation with the previous-stage device based on the fourth single-ended signal $SE_4$ to generate an eighth single-ended signal $SE_8$.

The single-ended-to-differential bridge SDi may be coupled to the processor Pi and the digital phase-locked loop LLi, and is configured to receive the fifth single-ended signal $SE_5$ and the sixth single-ended signal $SE_6$ from the digital phase-locked loop LLi, and respectively convert the same to $f_i$ and $1PPS_i$. In addition, the single-ended-to-differential bridge SDi may receive the seventh single-ended signal $SE_7$ and the eighth single-ended signal $SE_8$ from the processor Pi, and respectively convert the same into the control signal $C_i$ and $ToD_1$. Then, the single-ended-to-differential bridge SDi may send the $f_i$ and $1PPS_i$, the control signal $C_i$ and the $ToD_i$ to the network output interface Oi.

Moreover, the single-ended-to-differential bridge SDi may include an RS422 port SDi1 and a UART SDi2. The RS422 port SDi1 may be coupled to the second output pins (i.e., the numbers 4 and 5 of the network output interface Oi) and the above-mentioned time of day signal output pins (i.e., the numbers 7 and 8 of the network output interface Oi). In addition, the UART SDi2 may be coupled to the RS422 port SDi1 and the processor Pi. In the embodiment, the UART SDi2 may be used to respectively convert the seventh single-ended signal $SE_7$ and the eighth single-ended signal $SE_8$ into corresponding differential signals (i.e., the control signal $C_i$ and $ToD_i$), and bundle the control signal $C_i$ to $ToD_i$, and send the bundled control signal $C_i$ and $ToD_i$ to the RS422 port SDi1. Thereafter, the RS422 port SDi1 may transmit the bundled control signal $C_i$ and $ToD_i$ to the corresponding pins of the network output interface Oi for sending to (a network input interface) of the next-stage device, but the disclosure is not limited thereto.

Figure 9A:
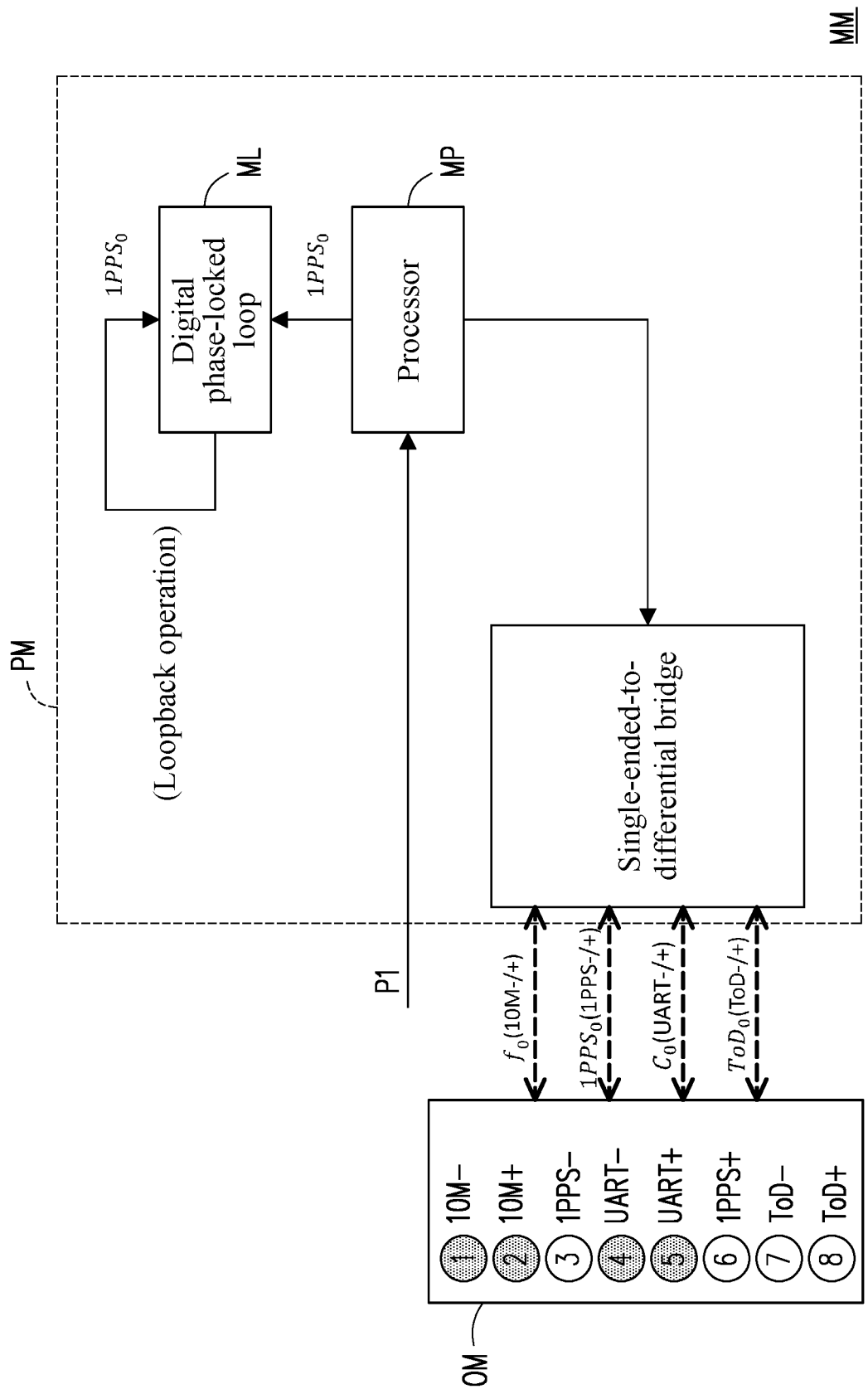
FIG. 9A is a functional block diagram of a management device according to an embodiment of the disclosure.

Referring to FIG. 9A, FIG. 9A is a functional block diagram of a management device according to an embodiment of the disclosure. As shown in FIG. 9A, the management device MM may include a processing module PM, a network output interface Oi, and a single-ended-to-differential bridge. In the embodiment, the processing module PM may be used to provide the reference synchronization signal $S_0$ and the reference control signal $C_0$. To be specific, the processing module PM may include a processor MP and a digital phase-locked loop ML, where the processor MP may decode the PTP packet P1 to obtain the corresponding $1PPS_0$, $f_0$, $ToD_0$ after receiving the PTP packet P1 from the GM (not shown) through the 10G interface. Thereafter, the processor MP may control the digital phase-locked loop ML to perform a loopback operation on $1PPS_0$ for comparing with $1PPS_N$ provided by the synchronization device DN. Moreover, the processor MP may generate the reference control signal $C_0$ used for requesting the synchronization device D1 to synchronize with the management device MM based on the reference synchronization signal $S_0$, and sends $1PPS_0$, $f_0$, $ToD_0$ and the reference control signal $C_0$ to the network output interface OM through the single-ended-to-differential bridge of the management device MM. Accordingly, the network output interface OM may send $1PPS_0$, $f_0$, $ToD_0$ and the reference control signal $C_0$ to the synchronization device D1.

In FIG. 9A, the signal transmission mode between the processor MP and the single-ended-to-differential bridge, and the operation mode of the single-ended-to-differential bridge may be deduced by referring to the related descriptions of the processor Pi and the single-ended-to-differential bridge SDi in FIG. 8, and the details thereof are not repeated.

Figure 9B:
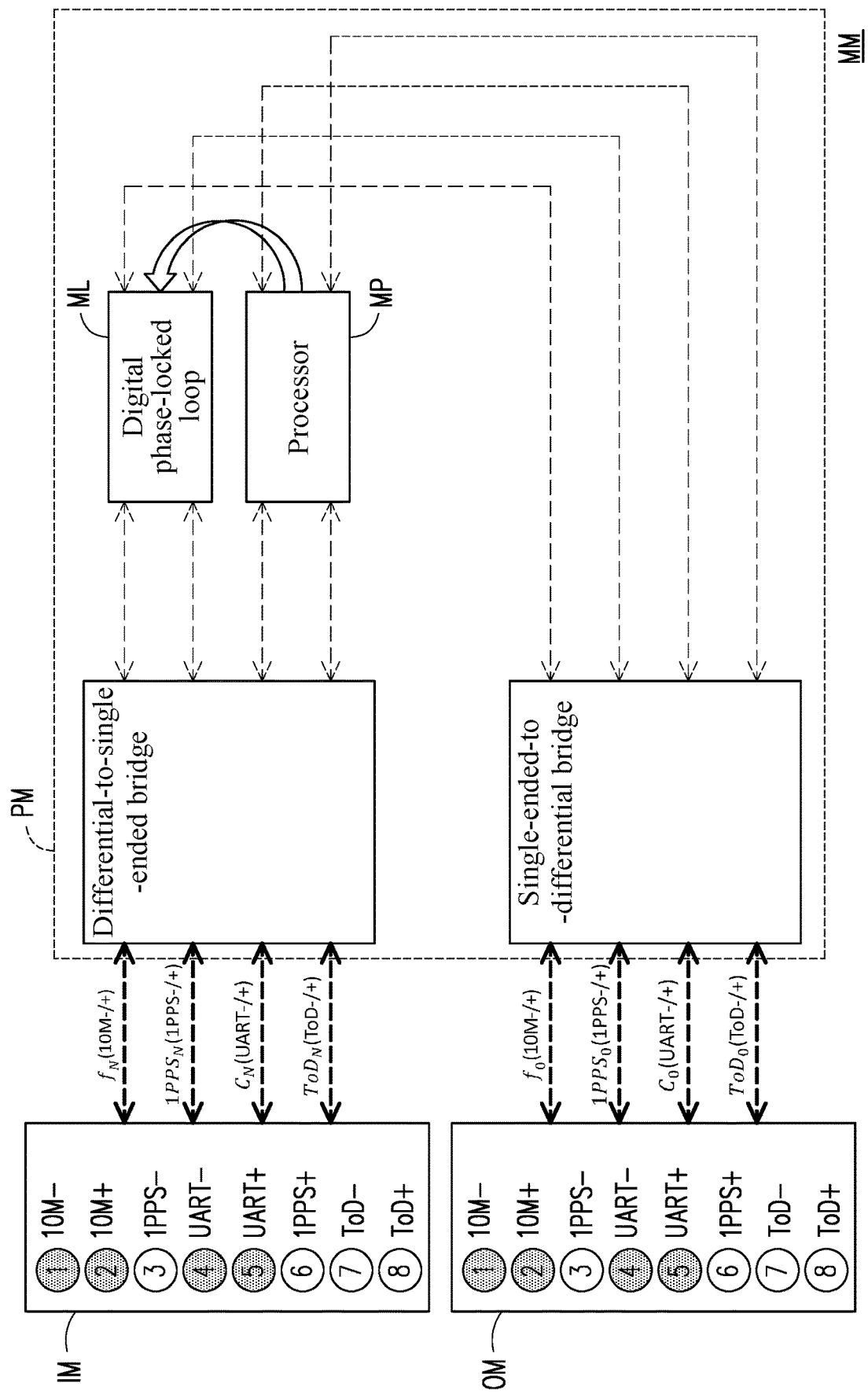
FIG. 9B is a functional block diagram of a management device shown in FIG. 9A.

Refer to FIG. 9B, FIG. 9B is a functional block diagram of a management device shown in FIG. 9A. In the embodiment, the management device MM may further include a network input interface IM, which may be used to receive $1PPS_N$, $f_N$, $ToD_N$ and the control signal $C_N$ from the synchronization device DN, and accordingly transmit the same to the processing module PM.

Moreover, the processing module PM of the embodiment may further include the differential-to-single-ended bridge as shown, and an operation method thereof may be deduced by referring to related description of the differential-to-single-ended bridge DSi in FIG. 8, and detail thereof is not repeated.

In summary, through the distributed synchronization system and method proposed by the disclosure, synchronization between the synchronization devices may be realized at a lower cost when the management device does not have the IEEE 1588 and SyncE functions. Moreover, compared with the conventional two-layer DDC framework, the single-layer DDC framework presented in the disclosure may achieve higher synchronization accuracy.

In addition, since the management device and the synchronization devices in the disclosure transmit/receive the corresponding control signals, the 1PPS signals, the time of day information and the frequency signals through the RJ45 output/input interface, rather than through an interface with higher transmission capacity in the data plane, the hardware resources of the management device and the synchronization devices may be used reasonably.

In addition, in order to allow the RJ45 output/input interface of the disclosure to be used for transmitting/receiving the control signals and the frequency signals, multiple pins in the RJ45 output/input interface of the disclosure may have definitions different from that of a conventional method.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A distributed synchronization system, comprising:
a plurality of synchronization devices connected in series with each other, wherein each of the synchronization devices comprises a network input interface and a network output interface; and
a management device, the management device comprising a network input interface and a network output interface and being configured to:
  receive a precision time protocol packet, and decode the precision time protocol packet to obtain a reference 1 pulse per second (PPS) signal, a reference frequency signal, and reference time of day information; and
  send a reference synchronization signal and a reference control signal to a first synchronization device among the synchronization devices through the network output interface of the management device, wherein the reference control signal requests the first synchronization device to synchronize with the management device based on the reference synchronization signal,
wherein the first synchronization device among the synchronization devices is configured to:
  receive the reference synchronization signal and the reference control signal through the network input interface of the first synchronization device;
  perform a synchronization operation with the management device based on the reference synchronization signal and the reference control signal, and accordingly generate $1PPS_1$, $f_1$, and $ToD_1$, wherein $1PPS_1$ is a 1PPS signal generated by the first synchronization device, $f_1$ is a frequency signal generated by the first synchronization device, and $ToD_1$ is time of day information generated by the first synchronization device; and
  send a first synchronization signal and a first control signal to a second synchronization device among the synchronization devices through the network output interface of the first synchronization device, wherein the first synchronization signal comprises $1PPS_1$, $f_1$, and $ToD_1$, and the first control signal requests the second synchronization device to synchronize with the first synchronization device, wherein $f_0$ and $f_1$ correspond to a preset frequency,
wherein the synchronization operation comprises a phase synchronization operation, and the first synchronization device is configured to:
  perform the phase synchronization operation based on 1PPS1 to generate a specific 1PPS signal, and estimate a specific offset between 1PPS0 and the specific 1PPS signal; and correct the specific 1PPS signal to 1 $PPS_1$ based on the specific offset, wherein the first synchronization device is connected to the management device through a 10 Gigabit Ethernet interface, and the first synchronization device is further configured to report the specific offset to the management device through the 10 Gigabit Ethernet interface.

2. The distributed synchronization system according to claim 1, wherein the reference synchronization signal comprises $1PPS_0$, $f_0$, and $ToD_0$, where $1PPS_0$ is the reference 1PPS signal, $f_0$ is the reference frequency signal, and $ToD_0$ is the reference time of day information.

3. The distributed synchronization system according to claim 1, wherein an $i^{th}$ synchronization device among the synchronization devices is configured to:

receive a synchronization signal and a control signal from an i-$1^{th}$ synchronization device among the synchronization devices through the network input interface of the $i^{th}$ synchronization device, where 1<i≤N, and N is a total number of the synchronization devices, wherein N is an integer greater than or equal to two, wherein the synchronization signal comprises $1PPS_{i-1}$, $f_{i-1}$, and $ToD_{i-1}$, where $1PPS_{i-1}$ is a 1PPS signal generated by the i-$1^{th}$ synchronization device, $f_{i-1}$ is a frequency signal generated by the i-$1^{th}$ synchronization device, and $ToD_{i-1}$ is time of day information generated by the i-$1^{th}$ synchronization device, wherein the control signal requests the $i^{th}$ synchronization device to synchronize with the i-$1^{th}$ synchronization device;

perform a synchronization operation with the i-$1^{th}$ synchronization device based on the synchronization signal and the control signal, and accordingly generate $1PPS_i$, $f_i$, and $ToD_i$; and send another synchronization signal and another control signal through the network output interface of the $i^{th}$ synchronization device, wherein the another synchronization signal comprises $1PPS_i$, $f_i$, and $ToD_i$, wherein for 1<i<N, the $i^{th}$ synchronization device sends the another synchronization signal and the another control signal to an i+$1^{th}$ synchronization device among the synchronization devices through the network output interface, and the another control signal requests the i+$1^{th}$ synchronization device to synchronize with the $i^{th}$ synchronization device, wherein $f_0$, $f_{i-1}$, and $f_i$ correspond to a preset frequency, wherein for i=N, the $i^{th}$ synchronization device sends the another synchronization signal and the another control signal to the network input interface of the management device through the network output interface, and the another control signal notifies the management device that the synchronization devices have completed synchronization.

4. The distributed synchronization system according to claim 3, wherein the $i^{th}$ synchronization device is configured to:

perform the phase synchronization operation based on $1PPS_{i-1}$ to generate a specific 1PPS signal, and estimate a specific offset between $1PPS_{i-1}$ and the specific 1PPS signal; and correct the specific 1PPS signal to $1PPS_i$ based on the specific offset, wherein the $i^{th}$ synchronization device is connected to the management device through a 10 Gigabit Ethernet interface, and the $i^{th}$ synchronization device is further configured to report the specific offset to the management device through the 10 Gigabit Ethernet interface.

5. The distributed synchronization system according to claim 1, wherein the synchronization devices comprise the first synchronization device to an $N^{th}$ synchronization device connected in series with each other, where N is a total number of the synchronization devices, wherein N is an integer greater than or equal to two, and the management device is further configured to:

receive a synchronization signal and a control signal from the $N^{th}$ synchronization device through the network input interface of the management device, wherein the synchronization signal comprises $1PPS_N$, $f_N$, and $ToD_N$, where $1PPS_N$ is a 1PPS signal generated by the $N^{th}$ synchronization device, $f_N$ is a frequency signal generated by the $N^{th}$ synchronization device, and $ToD_N$ is time of day information generated by the $N^{th}$ synchronization device, and the control signal is configured to notify the management device that the synchronization devices have completed synchronization;

estimate a phase offset between $1PPS_0$ and $1PPS_N$; and in response to determining that the phase offset is greater than an offset threshold, control at least one of the synchronization devices to perform a phase correction operation according to a difference between the phase offset and the offset threshold.

6. The distributed synchronization system according to claim 1, wherein the distributed synchronization system is a distributed disaggregated chassis system, the management device comprises a management switch, and each of the synchronization devices is a line card.

7. The distributed synchronization system according to claim 6, wherein each of the synchronization devices comprises a data plane and a control plane, and the network input interface and the network output interface belong to the control plane.

8. The distributed synchronization system according to claim 1, wherein the network input interface and the network output interface of the management device are respectively an RJ45 input interface and an RJ45 output interface.

9. The distributed synchronization system according to claim 1, wherein the network input interface and the network output interface of each of the synchronization devices are respectively an RJ45 input interface and an RJ45 output interface.

10. A distributed synchronization system, comprising a plurality of synchronization devices, wherein the synchronization devices are connected in series with each other and each comprises a network input interface and a network output interface, and a first synchronization device among the synchronization devices is configured to:

receive a reference synchronization signal and a reference control signal from a management device through the network input interface of the first synchronization device, wherein the reference control signal requests the first synchronization device to synchronize with the management device based on the reference synchronization signal;

perform a synchronization operation with the management device based on the reference synchronization signal and the reference control signal, and accordingly generate a first synchronization signal; and send the first synchronization signal and a first control signal to a second synchronization device among the synchronization devices through the network output interface of the first synchronization device, wherein the first control signal requests the second synchronization device to synchronize with the first synchronization device based on the first synchronization signal, wherein the synchronization operation comprises a phase synchronization operation, and the first synchronization device is configured to:
perform the phase synchronization operation based on 1PPS1 to generate a specific 1PPS signal, and estimate a specific offset between 1PPS0 and the specific 1PPS signal; and
correct the specific 1PPS signal to 1 $PPS_1$ based on the specific offset, wherein the first synchronization device is connected to the management device through a 10 Gigabit Ethernet interface, and the first synchronization device is further configured to report the specific offset to the management device through the 10 Gigabit Ethernet interface.

11. The distributed synchronization system according to claim 10, wherein the reference synchronization signal comprises $1PPS_0$, $f_0$, and $ToD_0$, where $1PPS_0$, $f_0$, and $ToD_0$ are respectively a reference 1 pulse per second (PPS) signal, a preset frequency signal, and preset time of day information obtained by the management device by decoding a precision time protocol packet.

12. The distributed synchronization system according to claim 10, wherein the first synchronization signal comprises $1PPS_1$, $f_1$, and $ToD_1$, where $1PPS_1$ is a 1PPS signal generated by the first synchronization device, $f_1$ is a frequency signal generated by the first synchronization device, and $ToD_1$ is time of day information generated by the first synchronization device.

13. A distributed synchronization system, comprising a plurality of synchronization devices connected in series with each other, wherein each of the synchronization devices comprises a network input interface and a network output interface, and an $i^{th}$ synchronization device of the synchronization devices is configured to:
receive a synchronization signal and a control signal from an i–$1^{th}$ synchronization device among the synchronization devices through the network input interface of the $i^{th}$ synchronization device, where $1<i\leq N$, and N is a total number of the synchronization devices, wherein N is an integer greater than or equal to two;
perform a synchronization operation with the i–$1^{th}$ synchronization device based on the synchronization signal and the control signal, and accordingly generate another synchronization signal; and
send the another synchronization signal and another control signal through the network output interface of the $i^{th}$ synchronization device,
wherein the synchronization operation comprises a phase synchronization operation, and the $i^{th}$ synchronization device is configured to:
perform the phase synchronization operation based on $1PPS_i$ to generate a specific 1PPS signal, and estimate a specific offset between $1PPS_{i-1}$ and the specific 1PPS signal; and
correct the specific 1PPS signal to $1PPS_i$ based on the specific offset, wherein the $i^{th}$ synchronization device is connected to the management device through a 10 Gigabit Ethernet interface, and the $i^{th}$ synchronization device is further configured to report the specific offset to the management device through the 10 Gigabit Ethernet interface.

14. The distributed synchronization system according to claim 13, wherein the synchronization signal comprises $1PPS_{i-1}$, $f_{i-1}$, and $ToD_{i-1}$, where $1PPS_{i-1}$ is a 1PPS signal generated by the i–$1^{th}$ synchronization device, $f_{i-1}$ is a frequency signal generated by the i–$1^{th}$ synchronization device, and $ToD_{i-1}$ is time of day information generated by the i–$1^{th}$ synchronization device.

15. The distributed synchronization system according to claim 13, wherein the another synchronization signal comprises $1PPS_i$, $f_i$, and $ToD_i$.

16. The distributed synchronization system according to claim 13, wherein for $1<i<N$, the $i^{th}$ synchronization device sends the another synchronization signal and the another control signal to an i+$1^{th}$ synchronization device among the synchronization devices through the network output interface, and the another control signal requests the i+$1^{th}$ synchronization device to synchronize with the $i^{th}$ synchronization device.

17. The distributed synchronization system according to claim 13, wherein for i=N, the $i^{th}$ synchronization device sends the another synchronization signal and the another control signal to a network input interface of a management device through the network output interface, and the another control signal notifies the management device that the synchronization devices have completed synchronization.

* * * * *